United States Patent
Yaginuma

(10) Patent No.: US 12,468,905 B2
(45) Date of Patent: Nov. 11, 2025

(54) WIRELESS TAG COMMUNICATION DEVICE AND WIRELESS TAG COMMUNICATION METHOD

(71) Applicant: TOSHIBA TEC KABUSHIKI KAISHA, Tokyo (JP)

(72) Inventor: Jun Yaginuma, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 18/666,878

(22) Filed: May 17, 2024

(65) Prior Publication Data

US 2025/0148229 A1 May 8, 2025

(30) Foreign Application Priority Data

Nov. 8, 2023 (JP) ................................. 2023-190987

(51) Int. Cl.
*G06K 7/10* (2006.01)

(52) U.S. Cl.
CPC ............................... *G06K 7/10316* (2013.01)

(58) Field of Classification Search
CPC .................................................. G06K 7/10316
See application file for complete search history.

(56) References Cited

U.S. PATENT DOCUMENTS

| | | | | |
|---|---|---|---|---|
| 6,046,683 A * | 4/2000 | Pidwerbetsky | .......... | H04B 1/40 342/51 |
| 10,013,590 B2 * | 7/2018 | Lim | ................... | G06K 7/10009 |
| 12,056,565 B2 * | 8/2024 | Tu | .......... | H01Q 1/2216 |
| 2006/0267733 A1 * | 11/2006 | Steinke | .............. | G06K 7/10386 340/10.3 |
| 2013/0187761 A1 * | 7/2013 | Shoarinejad | .......... | H04W 88/08 340/10.1 |
| 2018/0260592 A1 * | 9/2018 | Trishaun | ............ | G06K 7/10316 |
| 2021/0264120 A1 * | 8/2021 | Suzuki | ............... | G06K 7/10108 |
| 2023/0229876 A1 * | 7/2023 | Tu | ...................... | G06K 7/10386 340/10.1 |
| 2024/0291133 A1 * | 8/2024 | Jaffri | .................... | G06K 7/1097 |

FOREIGN PATENT DOCUMENTS

JP     2011-237941     11/2011

* cited by examiner

*Primary Examiner* — Travis R Hunnings
(74) *Attorney, Agent, or Firm* — Amin, Turocy & Watson, LLP

(57) ABSTRACT

A wireless tag communication device includes a communication device, a position detection sensor, a memory, and a processor. The communication device communicates with a wireless tag. The sensor detects information indicating a self position of the wireless tag communication device. The memory stores the self position, based on the information detected by the position detection sensor, in association with a reading result obtained by reading a wireless tag by the communication device. The processor estimates, using a processing method selected according to a distance between the self position, which is specified based on the information detected by the position detection sensor, and an estimated position of the wireless tag, a position of the wireless tag based on reading results obtained by reading the wireless tag at three different self positions each including the self position serving as an endpoint of the distance, the reading results being stored.

19 Claims, 13 Drawing Sheets

FIG. 5

| ANGLE [deg] | ANGLE [rad] | X | Y | DISTANCE [m] | DIFFERENCE DISTANCE [m] | Li/Lr |
|---|---|---|---|---|---|---|
| 0 | 0 | 0.000 | 7.500 | 7.500 | 0.500 | 1 |
| 10 | 0.174533 | 0.087 | 7.508 | 7.508 | 0.492 | 0.983804 |
| 20 | 0.349066 | 0.171 | 7.530 | 7.532 | 0.468 | 0.935809 |
| 30 | 0.523599 | 0.250 | 7.567 | 7.571 | 0.429 | 0.857768 |
| 40 | 0.698132 | 0.321 | 7.617 | 7.624 | 0.376 | 0.752489 |
| 50 | 0.872665 | 0.383 | 7.679 | 7.688 | 0.312 | 0.623694 |
| 60 | 1.047198 | 0.433 | 7.750 | 7.762 | 0.238 | 0.475825 |
| 70 | 1.22173 | 0.470 | 7.829 | 7.843 | 0.157 | 0.313848 |
| 80 | 1.396263 | 0.492 | 7.913 | 7.928 | 0.072 | 0.143038 |
| 90 | 1.570796 | 0.500 | 8.000 | 8.016 | −0.016 | −0.03122 |
| 100 | 1.745329 | 0.492 | 8.087 | 8.102 | −0.102 | −0.2036 |
| 110 | 1.919862 | 0.470 | 8.171 | 8.185 | −0.185 | −0.36901 |
| 120 | 2.094395 | 0.433 | 8.250 | 8.261 | −0.261 | −0.52271 |
| 130 | 2.268928 | 0.383 | 8.321 | 8.330 | −0.330 | −0.66041 |
| 140 | 2.443461 | 0.321 | 8.383 | 8.389 | −0.389 | −0.77836 |
| 150 | 2.617994 | 0.250 | 8.433 | 8.437 | −0.437 | −0.87344 |
| 160 | 2.792527 | 0.171 | 8.470 | 8.472 | −0.472 | −0.94315 |
| 170 | 2.96706 | 0.087 | 8.492 | 8.493 | −0.493 | −0.9857 |
| 180 | 3.141593 | 0.000 | 8.500 | 8.500 | −0.500 | −1 |

FIG. 8

| Li/Lr | DISTANCE L (m) TO ESTIMATED TAG POSITION | | | | | | | |
|---|---|---|---|---|---|---|---|---|
| | ≤1.5 | 1.5<L ≤2.5 | 2.5<L ≤3.5 | 3.5<L ≤4.5 | 4.5<L ≤5.5 | 5.5<L ≤6.5 | 6.5<L ≤7.5 | 7.5<L |
| 1.00 | 0 | 0 | 0 | 0 | 0 | 0 | 0 | 0 |
| 0.90 | 22 | 24 | 25 | 25 | 26 | 26 | 26 | 26 |
| 0.80 | 32 | 35 | 36 | 36 | 36 | 37 | 37 | 37 |
| 0.70 | 40 | 43 | 44 | 45 | 45 | 45 | 45 | 45 |
| 0.60 | 46 | 50 | 51 | 52 | 52 | 52 | 53 | 53 |
| 0.50 | 53 | 57 | 58 | 59 | 59 | 59 | 59 | 60 |
| 0.40 | 59 | 63 | 64 | 65 | 65 | 66 | 66 | 66 |
| 0.30 | 65 | 69 | 70 | 71 | 71 | 72 | 72 | 72 |
| 0.20 | 70 | 75 | 76 | 77 | 77 | 78 | 78 | 78 |
| 0.10 | 76 | 80 | 82 | 83 | 83 | 83 | 84 | 84 |
| 0.00 | 82 | 86 | 88 | 88 | 89 | 89 | 89 | 89 |
| -0.10 | 88 | 92 | 93 | 94 | 95 | 95 | 95 | 95 |
| -0.20 | 94 | 98 | 99 | 100 | 100 | 101 | 101 | 101 |
| -0.30 | 100 | 104 | 105 | 106 | 106 | 107 | 107 | 107 |
| -0.40 | 106 | 110 | 111 | 112 | 113 | 113 | 113 | 113 |
| -0.50 | 113 | 117 | 118 | 119 | 119 | 119 | 119 | 120 |
| -0.60 | 121 | 124 | 125 | 126 | 126 | 126 | 126 | 127 |
| -0.70 | 129 | 132 | 133 | 133 | 134 | 134 | 134 | 134 |
| -0.80 | 139 | 141 | 142 | 142 | 143 | 143 | 143 | 143 |
| -0.90 | 151 | 153 | 153 | 154 | 154 | 154 | 154 | 154 |
| -1.00 | 180 | 180 | 180 | 180 | 180 | 180 | 180 | 180 |

FIG. 14

| DISTANCE TO ESTIMATED TAG POSITION | CALCULATION EXPRESSION |
|---|---|
| 1.5 m OR LESS | $y = 0.0007x^3 - 0.019x^2 + 0.0036x + 1.0405$ |
| 2m±50cm | ※ |
| 3m±50cm | $y = 0.0008x^3 - 0.022x^2 + 0.0417x + 0.9843$ |
| 4m±50cm | ※ |
| 5m±50cm | $y = 0.0008x^3 - 0.0224x^2 + 0.0478x + 0.9745$ |
| 6m±50cm | ※ |
| 7 m OR MORE | $y = 0.0008x^3 - 0.0225x^2 + 0.0503x + 0.9705$ |

WIRELESS TAG COMMUNICATION DEVICE AND WIRELESS TAG COMMUNICATION METHOD

CROSS-REFERENCE TO RELATED APPLICATION

This application is based upon and claims the benefit of priority from Japanese Patent Application No. 2023-190987, filed on Nov. 8, 2023, the entire contents of which are incorporated herein by reference.

FIELD

Embodiments described herein relate generally to a wireless tag communication device and a wireless tag communication method.

BACKGROUND

In the related art, there is a wireless tag communication device for finding an RFID tag (hereinafter also referred to as a wireless tag) located at an unspecified position. The wireless tag communication device communicates with the RFID tag while a position and an orientation of an antenna thereof are changed by an operation of an operator. The wireless tag communication device in the related art estimates a direction in which an RFID tag to be searched exists based on a communication state with the RFID tag to be searched.

The wireless tag communication device in the related art displays, on a display, a guidance screen including an estimation result of the direction in which the RFID tag exists, thereby reporting the direction in which the RFID tag exists to the operator. The operator searches for the RFID tag or an article to which the RFID tag is attached while moving in the direction displayed on the display. However, the wireless tag communication device in the related art reports the direction in which the RFID tag exists, and does not report a position of the RFID tag to be searched.

DESCRIPTION OF THE DRAWINGS

FIG. 5 is a diagram illustrating an example of a table indicating an angle with respect to a ratio between a movement distance of the wireless tag communication device according to the embodiment and a distance of approaching the tag;

FIG. 8 is a diagram illustrating an example in which an angle determination table is set according to the distance from the wireless tag communication device according to the embodiment to the tag.

FIG. 14 is a diagram illustrating an example of a calculation formula set for each distance from the wireless tag communication device according to the embodiment to the tag.

DETAILED DESCRIPTION

Regarding the wireless tag communication device in the related art, there is a problem that it takes time for an operator who is unfamiliar with the operation to find the RFID tag. In order to solve the above problems, according to one embodiment, a wireless tag communication device and a wireless tag communication method capable of accurately specifying a location where a wireless tag exists are provided.

According to one embodiment, a wireless tag communication device includes a communication device, a position detection sensor, a memory, and a processor. The communication device communicates with a wireless tag that is a target. The position detection sensor detects information indicating a self position of the wireless tag communication device. The memory stores the self position, which is specified based on the information detected by the position detection sensor, in association with a reading result obtained by reading a wireless tag by the communication device. The processor estimates, using a processing method selected according to a distance between the self position, which is specified based on the information detected by the position detection sensor, and an estimated position of the wireless tag, a position of the wireless tag based on reading results obtained by reading the wireless tag at three different self positions each including the corresponding self position serving as an endpoint of the distance, the reading results being stored in the memory.

Hereinafter, an embodiment will be described with reference to the drawings.

First, a configuration of a wireless tag communication device (wireless tag reading device) 1 according to the embodiment will be described.

Figure 1:
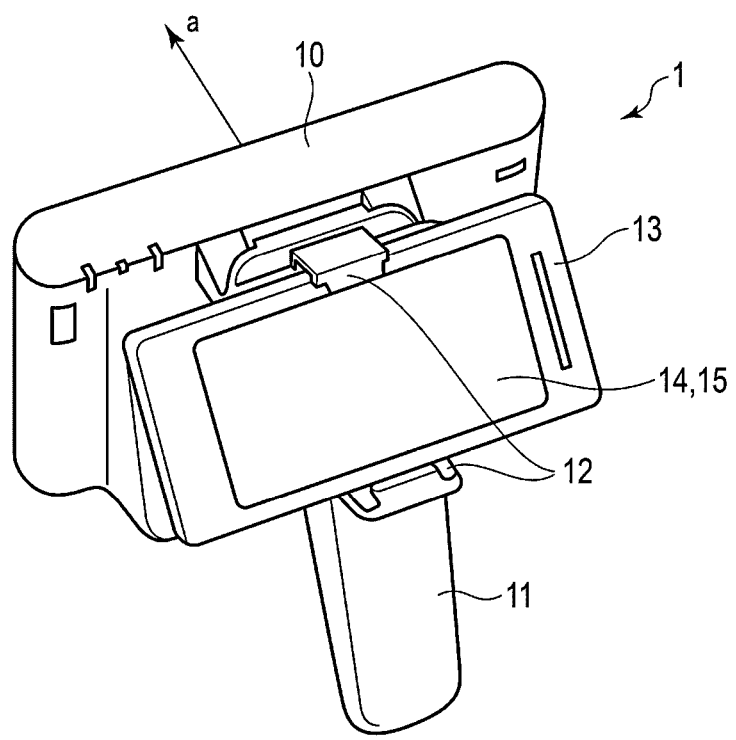
FIG. 1 is an external view illustrating a configuration example of an external appearance of a wireless tag communication device according to an embodiment.

FIG. 1 is a diagram illustrating a configuration example of an external appearance of the wireless tag communication device 1 according to the embodiment.

The wireless tag communication device 1 illustrated in FIG. 1 is a handy-type device that is operated by an operator while being held. The wireless tag communication device 1 illustrated in FIG. 1 is operated as a search device for searching for an RFID tag or an article to which an RFID tag is attached, for example.

The wireless tag communication device 1 according to the embodiment communicates with an RFID tag (a wireless tag). The wireless tag communication device 1 is a wireless tag reading device that reads tag information and the like recorded in the RFID tag by communicating with the RFID tag. The wireless tag communication device 1 estimates a position where the RFID tag exists based on a reading result of the RFID tag. The wireless tag communication device 1 displays, on a display, a guidance screen indicating information on an estimated position where the RFID tag exists.

The RFID tag is a wireless communication device that operates in response to a radio wave (an output signal) from the wireless tag communication device 1. The RFID tag includes a processor, a memory, a communication circuit, an antenna, and the like. The RFID tag outputs a response signal including tag information recorded in one's own memory in response to a read command from the wireless tag communication device 1. For example, the RFID tag is attached to an article such as a commodity or a part. In an RFID tag attached to an article, tag information including information specifying the article is recorded in an internal memory thereof.

The wireless tag communication device 1 according to the embodiment is operated by an operator. The wireless tag communication device 1 is a device that communicates with a designated RFID tag while being moved. For example, the wireless tag communication device 1 is a handy-type device to be held in the hand of an operator and operated while being moved. The wireless tag communication device 1 may be mounted on a moving body operated by the operator.

The wireless tag communication device 1 according to the embodiment reads an RFID tag attached to an article while a position and an orientation thereof are changed by an operation of the operator. For example, the wireless tag communication device 1 operates as a search device for searching for an article, to which an RFID tag is attached, in a predetermined area (a search range) of a warehouse, a store or the like. The wireless tag communication device 1 serving as a search device continuously reads the RFID tag to be searched while a position thereof is changed by the operation of the operator.

The wireless tag communication device 1 reads tag information recorded in an RFID tag existing in a reading area (a reading range) by receiving a response signal from the RFID tag. Further, the wireless tag communication device 1 acquires information such as an RSSI value and a phase value from the response (reception) signal from the RFID tag. The wireless tag communication device 1 stores the tag information, the RSSI value, and the phase value obtained from the reception signal together with information such as the position and the orientation of the own device as a reading result in the memory.

In a configuration example illustrated in FIG. 1, the wireless tag communication device 1 includes a reader device (base device) 10 and an information terminal device 13 serving as a user interface. The reader device 10 may be provided as the wireless tag communication device 1. In this case, the wireless tag communication device 1 as the reader device 10 is operated in a state where the information terminal device 13 as an external device is set as a user interface.

The reader device 10 includes a casing in which an RFID tag interface including an antenna and a communication control circuit is installed. In the reader device 10, the antenna is provided so as to have the strongest directivity in a direction of an arrow a shown in FIG. 1. Here, it is assumed that the direction of the arrow a is a front (front side) direction of the wireless tag communication device 1. Further, it is assumed that the front direction of the wireless tag communication device 1 is an orientation of the antenna.

The reader device 10 includes a grip portion 11 and a holding portion 12 in addition to a configuration of a control system to be described later. The grip portion 11 is a portion to be gripped by an operator. The holding portion 12 is implemented by a tool for holding the information terminal device 13. The holding portion 12 holds the information terminal device 13 such that a display screen of a display 14 of the information terminal device 13 faces the operator who grips the grip portion 11. The wireless tag communication device 1 is operated by an operator gripping the grip portion 11 in a state where the information terminal device 13 is set in the holding portion 12.

The information terminal device 13 includes the display 14 and an input device 15. The display 14 and the input device 15 are, for example, display devices with a touch panel. In a state where the information terminal device 13 is set in the holding portion 12 of the reader device 10, the operator can visually recognize a screen displayed by the display 14. In addition, in the state where the information terminal device 13 is set in the holding portion 12 of the reader device 10, an operation instruction of the operator is input to the input device 15.

The wireless tag communication device 1 continuously reads an RFID tag while being operated by the operator. For example, the operator moves while gripping the grip portion 11 to change the position of the wireless tag communication device 1 provided with the antenna (the position of the own device). The wireless tag communication device 1 repeatedly reads an RFID tag in a reading area set by the orientation of the antenna and a magnitude of a radio wave output from the antenna while estimating the position of the own device.

The wireless tag communication device 1 estimates the position of the own device using a self-estimation technique. For example, the wireless tag communication device 1 estimates, based on an image captured by a camera, a self position (the position of the own device) by a self-position estimation method used in AR (augmented reality) technology. The method, the configuration, and the like for estimating the position of the own device that are used in the wireless tag communication device 1 are not limited to specific ones as long as the self position can be estimated even in a room or the like.

Based on the reading result of the RFID tag in the reading area set based on the orientation of the antenna and the magnitude of the radio wave output from the antenna, the wireless tag communication device 1 determines whether the RFID tag to be searched exists in the reading area. For example, the wireless tag communication device 1 stores, in the memory, reading results of the RFID tag to be searched that are obtained in a plurality of reading areas with a plurality of moved positions of the own device as base points. For example, the wireless tag communication device 1 stores information such as tag information, a phase value, an antenna orientation, and an output value in the memory as a reading result of an RFID tag. The wireless tag communication device 1 sets a reading result including tag information on the RFID tag to be searched as a reading result of a specific RFID tag and stores, in the memory, the reading result in association with information (position information) indicating a self position of the wireless tag communication device 1.

The wireless tag communication device 1 estimates the position where the RFID tag to be searched exists based on reading results obtained at a plurality of different self positions, the reading results being stored in the memory. For example, the wireless tag communication device 1 estimates the position (tag position) of the RFID tag to be searched based on reading results obtained by reading the RFID tag to be searched at three or more different self positions at a predetermined interval.

Next, a configuration of the control system in the wireless tag communication device 1 according to the embodiment will be described.

Figure 2:
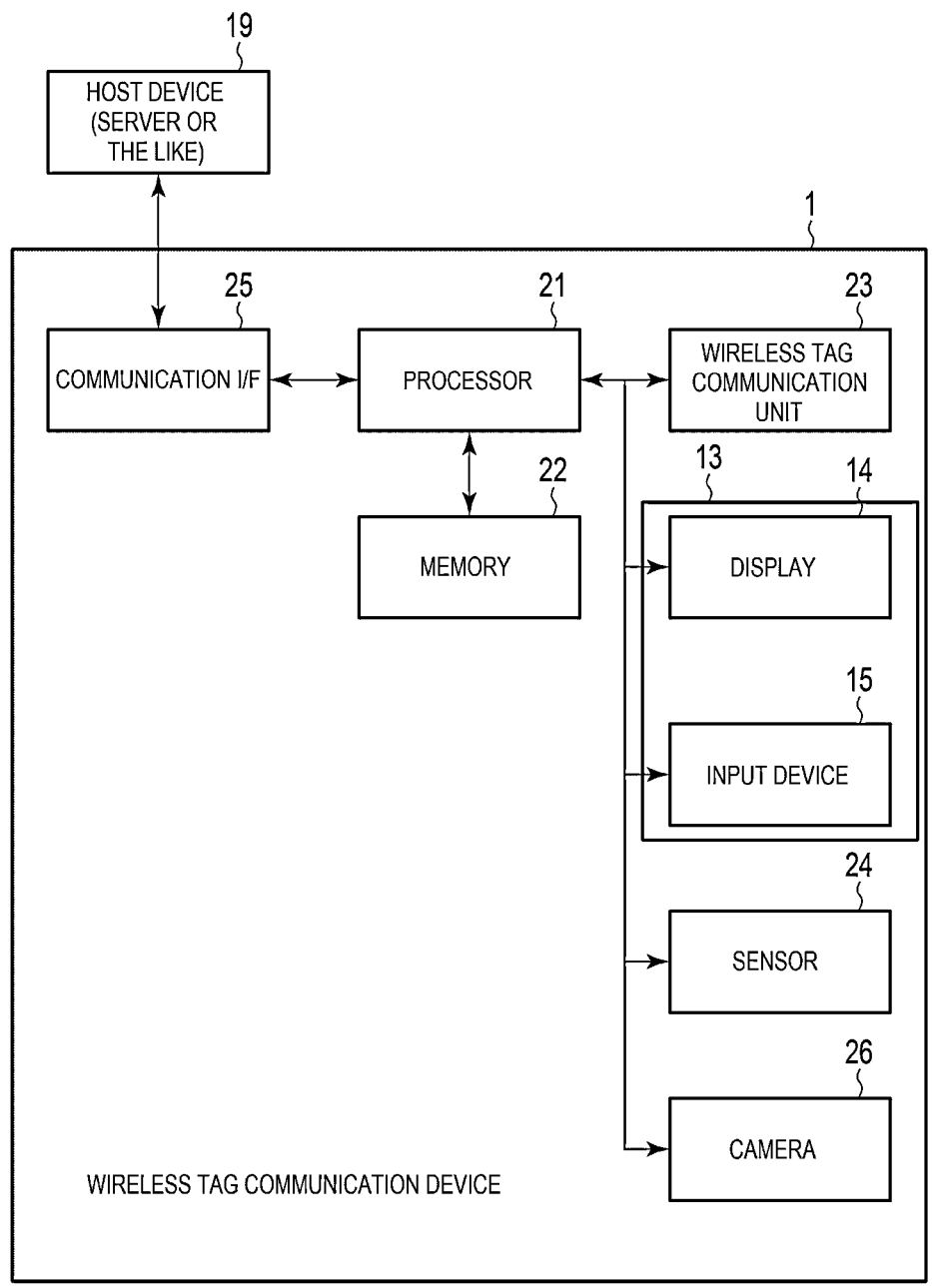
FIG. 2 is a block diagram schematically illustrating a first configuration example of a control system in the wireless tag communication device according to the embodiment.

FIG. 2 is a block diagram schematically illustrating a first configuration example of the control system in the wireless tag communication device 1 according to the embodiment.

In the configuration example illustrated in FIG. 2, the wireless tag communication device 1 includes a processor 21, a memory 22, a wireless tag communication unit 23, a sensor 24, a communication interface (I/F) 25, a camera 26, the display 14, and the input device 15.

The processor 21 controls the units. The processor 21 includes, for example, an arithmetic circuit such as a CPU. The processor 21 implements control of the units and various types of data processing by executing a program. The processor 21 may include an internal memory. The processor 21 executes various types of processing by executing programs stored in the memory 22 or the like.

The memory 22 includes various memories. For example, the memory 22 includes memories such as a ROM, a RAM, and an NVM. The ROM is a non-rewritable nonvolatile memory. The ROM stores a program or the like executed by the processor 21. The RAM is a volatile memory that temporarily stores data. The RAM operates as a working memory or a buffer memory.

The NVM of the memory 22 is a rewritable nonvolatile memory. The memory 22 stores information such as control information, setting information, and processing results in the NVM. In addition, the memory 22 stores, in the NVM, various programs for the processor 21 to execute various types of processing to be described later. For example, the memory 22 stores, in the NVM, an operation support program for outputting information for supporting the operator's operation on the casing. In addition, the memory 22 stores, in the NVM, an evaluation reference value for the operation support program to evaluate the operation on the casing.

The wireless tag communication unit 23 is a communication device constituting an RFID interface for communicating with an RFID tag. The wireless tag communication unit 23 is, for example, a communication device including a communication control circuit and an antenna. The wireless tag communication unit 23 may be implemented by a connection interface to be connected to an external antenna.

In the wireless tag communication unit 23, the communication control circuit includes a control circuit for communicating with the RFID tag via the antenna. The communication control circuit causes the antenna to transmit, at a set output value, a transmission signal (a radio wave) supplied from the processor 21. The antenna outputs the transmission signal supplied from the communication control circuit as a radio wave receivable by the RFID tag. The wireless tag communication unit 23 sets a range (a reading area, a reading range), in which the RFID tag can give a response, based on the orientation of the antenna and the output value of the radio wave output from the antenna.

In the wireless tag communication unit 23, the communication control circuit not only outputs a transmission signal to the antenna but also supplies a signal received by the antenna as reception data to the processor 21. The antenna receives a response signal from the RFID tag, and the communication control circuit processes the response signal (a reception signal) received by the antenna and supplies the processed signal to the processor 21. For example, the communication control circuit supplies tag information included in the reception signal from the RFID tag, an RSSI value indicating a strength of the reception signal, and a phase value to the processor 21.

The sensor (sensor group) 24 detects a position of the wireless tag communication device 1 or a change in position. For example, the sensor 24 is an acceleration sensor, a gyro sensor, or a geomagnetic field (azimuth) sensor. The sensor 24 may include a plurality of types of sensors. The sensor 24 may include a position detection sensor configured to detect a position of the wireless tag communication device 1. The sensor 24 is an example of the position detection sensor that detects information indicating a self position (the position of the communication device).

The communication I/F 25 is an interface for communicating with an external device. The communication I/F 25 is a communication interface for communicating with a host device 19 such as a server. The communication I/F 25 may be an interface for wired communication or an interface for wireless communication.

The camera 26 takes an image. An imaging direction of the camera 26 changes according to the orientation of the wireless tag communication device 1. For example, the imaging direction in which the camera 26 performs imaging may be set to coincide with the orientation of the antenna of the wireless tag communication unit 23. The image taken by the camera 26 is used to estimate the position of the wireless tag communication device 1 (the position of the own device). The camera 26 is an example of the position detection sensor that detects information indicating a self position (the position of the communication device). For example, the wireless tag communication device 1 estimates, based on an image captured by the camera 26, the self position (the position of the own device) by a self-position estimation method used in AR (augmented reality) technology.

The display 14 and the input device 15 provided in the information terminal device 13 are connected to the processor 21 via an internal interface. The display 14 is a device configured to display information. For example, the display 14 displays a display screen instructed by the processor 21. The input device 15 is a device for an operator to input an operation instruction or the like. The input device 15 supplies information indicating contents instructed by the operator to the processor 21.

The wireless tag communication device 1 includes a power supply that supplies power for operation. The handy-type wireless tag communication device 1 includes, for example, a rechargeable battery (a secondary battery) as the power supply. The battery supplies source power for operating the units in the wireless tag communication device 1 to the units. The camera 26 in the wireless tag communication device 1 may be replaced with a device for specifying the position of the wireless tag communication device 1.

Next, the configuration of the control system in the wireless tag communication device 1 according to the embodiment will be described.

Figure 3:
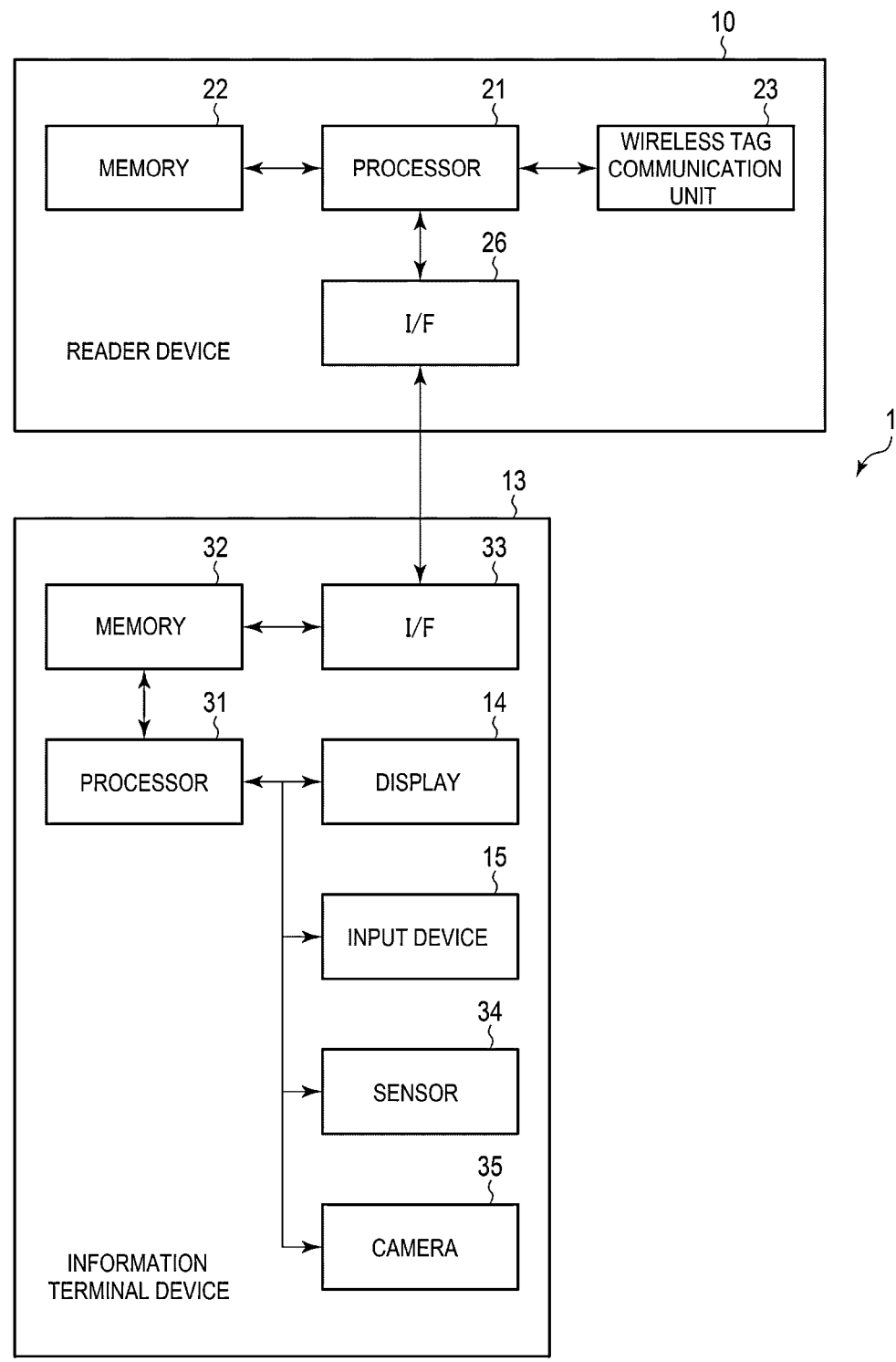
FIG. 3 is a block diagram schematically illustrating a second configuration example of the control system.

FIG. 3 is a block diagram schematically illustrating a second configuration example of the control system in the wireless tag communication device 1 according to the embodiment.

In the configuration example illustrated in FIG. 3, the reader device 10 serving as the wireless tag communication device 1 is connected to the information terminal device 13 serving as an external device. The reader device 10 serving as the wireless tag communication device 1 includes the processor 21, the memory 22, the wireless tag communication unit 23, and an interface (I/F) 26.

The processor 21 controls the units. The processor 21 includes, for example, an arithmetic circuit such as a CPU. The processor 21 implements control of the units and various types of data processing by executing a program. The processor 21 may include an internal memory. The processor 21 executes various types of processing by executing programs stored in the memory 22 or the like.

The memory 22 includes various memories. For example, the memory 22 includes memories such as a ROM, a RAM, and an NVM. The ROM is a non-rewritable nonvolatile memory. The ROM stores a program or the like executed by the processor 21. The RAM is a volatile memory that temporarily stores data. The RAM operates as a working memory or a buffer memory. The NVM is a rewritable nonvolatile memory. The NVM stores information such as control information, setting information, and processing results. The NVM of the memory 22 stores various programs for the processor 21 to execute various types of processing to be described later.

The wireless tag communication unit 23 is a communication device constituting an RFID interface for communicating with an RFID tag. The wireless tag communication unit 23 is a communication device including a communication control circuit and an antenna. The wireless tag communication unit 23 may be implemented by a connection interface to be connected to an external antenna.

In the wireless tag communication unit 23, the communication control circuit includes a control circuit for communicating with the RFID tag via the antenna. The communication control circuit causes the antenna to transmit, at a set output value, a transmission signal (a radio wave) supplied from the processor 21. The antenna outputs the transmission signal supplied from the communication control circuit as a radio wave receivable by the RFID tag. The wireless tag communication unit 23 sets a range (a reading area), in which the RFID tag can give a response, based on an orientation of the antenna and the output value of the radio wave output from the antenna.

In the wireless tag communication unit 23, the communication control circuit not only outputs a transmission signal to the antenna but also supplies a signal received by the antenna as reception data to the processor 21. The antenna receives a response signal from the RFID tag, and the communication control circuit processes the response signal (a reception signal) received by the antenna and supplies the processed signal to the processor 21. For example, the communication control circuit supplies tag information included in the reception signal from the RFID tag, an RSSI value indicating a strength of the reception signal, and a phase value to the processor 21.

It is sufficient that the interface 26 corresponds to an interface 33 provided in the information terminal device 13. For example, the interface 26 may be physically connected to an interface provided in the information terminal device 13, such as a universal serial bus (USB) interface or a LAN interface. Further, the interface 26 may be a Bluetooth (registered trademark) interface or a WiFi (registered trademark) interface for wireless communication connection.

The reader device 10 serving as the wireless tag communication device 1 includes a power supply configured to supply power for operation. The handy-type wireless tag communication device 1 includes, for example, a rechargeable battery (a secondary battery) as the power supply. The battery supplies source power for operating the units in the wireless tag communication device 1 to the units.

In the configuration example illustrated in FIG. 3, the information terminal device 13 is set in the holding portion 12 of the reader device 10 serving as the wireless tag communication device 1. The information terminal device 13 includes the display 14, the input device 15, and the like, and may be any device that is communicably connected to the reader device 10 serving as the wireless tag communication device 1. The information terminal device 13 is, for example, a portable information processing device such as a smartphone or a tablet PC.

As illustrated in FIG. 3, the information terminal device 13 includes a processor 31, a memory 32, the interface (I/F) 33, a sensor 34, a camera 35, the display 14, and the input device 15.

The processor 31 controls the units and performs data processing. The processor 31 is, for example, a CPU. The processor 31 implements various operations by executing programs stored in the memory 32.

The interface 33 is an interface (a second communication interface) for communication connection with the interface 26. It is sufficient that the interface 33 corresponds to the interface 26. For example, the interface 33 is a LAN interface, a USB interface, a Bluetooth interface, or a WiFi interface.

The sensor (sensor group) 34 includes a sensor that detects a position of the information terminal device 13 or a change in position. For example, the sensor 34 is an acceleration sensor, a gyro sensor, or a geomagnetic field (azimuth) sensor. The sensor 34 may include a plurality of types of sensors. The sensor 34 may include a position detection sensor for detecting a position. In this case, the sensor 34 is an example of the position detection sensor that detects information indicating a self position (the position of the communication device). A part or all of sensors serving as the sensor 34 as described above may be provided in the reader device 10.

The camera 35 takes an image. An imaging direction of the camera 35 changes according to an orientation of the reader device 10 in a state where the information terminal device 13 is set to the reader device 10. For example, the imaging direction in which the camera 35 performs imaging may be set to coincide with the orientation of the antenna of the wireless tag communication unit 23 provided in the reader device 10.

The image taken by the camera 35 is used to estimate a position of the information terminal device 13 (a position of the wireless tag communication device 1 including the reader device 10 to which the information terminal device 13 is set, that is, a position of an own device). The camera 35 is an example of the position detection sensor that detects information indicating a self position (the position of the communication device). For example, the processor 31 of the information terminal device 13 estimates, based on an image captured by the camera 35, a self position (the position of the own device) by a self-position estimation method used in AR (augmented reality) technology.

Next, a configuration of the wireless tag communication unit 23 in the wireless tag communication device 1 according to the embodiment will be described in detail.

As described above, the wireless tag communication unit (communication device) 23 includes a communication control circuit and an antenna. The communication control circuit of the wireless tag communication unit 23 includes a modulation circuit, a transmission-side amplifier circuit, a coupler, a reception-side amplifier circuit, a demodulation circuit, an output setting circuit, and a level detection circuit. The antenna of the wireless tag communication unit 23 is connected to the coupler of the communication control circuit. The antenna transmits and receives radio waves for communicating with an RFID tag. The communication control circuit processes a signal to be transmitted to the RFID tag via the antenna and a signal received from the RFID tag via the antenna.

The modulation circuit modulates a waveform signal (a carrier wave) with input transmission data. The transmission-side amplifier circuit amplifies an output signal of the modulation circuit. The coupler supplies an output signal of the transmission-side amplifier circuit to the antenna. With these configurations, the communication control circuit outputs the carrier wave modulated with the transmission data from the antenna.

The RFID tag receives a radio wave as a transmission signal transmitted from the antenna. The RFID tag recognizes, for example, a read command included in the transmission signal transmitted from the antenna. When the RFID tag recognizes the read command, the RFID tag outputs data (tag information) stored in one's own memory in the form of a radio wave, for example, by backscatter modulation.

The antenna receives the radio wave as a reception signal output from the RFID tag. The communication control circuit acquires, using the coupler, the reception signal received by the antenna, and supplies the acquired reception signal to the reception-side amplifier circuit. The reception-side amplifier circuit amplifies the reception signal received by the antenna. The demodulation circuit demodulates the data (the tag information) included in the reception signal amplified by the reception-side amplifier circuit.

The antenna of the wireless tag communication unit 23 has directivity, and is installed at a predetermined position of the wireless tag communication device 1 and faces a predetermined direction. The antenna is, for example, a planar antenna. The antenna of the wireless tag communication unit 23 is not limited to a specific configuration. The antenna is disposed in a casing so as to transmit an electromagnetic wave (an output signal) toward a communication area (a reading area) centered on a direction (for example, a-direction shown in FIG. 1) in which the directivity is maximum. The wireless tag communication device 1 is configured such that the direction in which the directivity of the antenna is maximum is the front (the a-direction shown in FIG. 1).

The communication control circuit of the wireless tag communication unit 23 sets, by using the output setting circuit, a strength (an output value) of a signal to be output. The transmission-side amplifier circuit amplifies a signal, which is supplied from the modulation circuit, to the output value set by the output setting circuit. The antenna transmits an output signal (a radio wave) at an output value set by the output setting circuit, which is supplied from the transmission-side amplifier circuit via the coupler.

The wireless tag communication unit 23 sets a range (a reading area) for transmitting a radio wave to which an RFID tag can give a response, the range corresponding to the orientation of the antenna and the output value of the radio wave output from the antenna. The reading area to be set by the wireless tag communication unit 23 is set based on the orientation of the antenna, the directivity of the antenna, and the output value of the output signal. The wireless tag communication unit 23 sets the reading area by controlling the output value of the output signal according to an instruction from the processor 21.

The communication control circuit of the wireless tag communication unit 23 processes a response signal (a reception signal) received by the antenna and supplies the processed signal to the processor 21. The communication control circuit supplies tag information included in the reception signal from the RFID tag, an RSSI value indicating a strength of the reception signal, and a phase value to the processor 21. For example, the communication control circuit of the wireless tag communication unit 23 detects, by using the level detection circuit, information for specifying the RSSI value indicating the strength of the reception signal (the response signal from the RFID tag) received by the antenna. In addition, the processor 21 acquires phase values of a plurality of reception signals received by the communication control circuit of the wireless tag communication unit 23 at different positions of an own device, and detects a phase difference between the reception signals received at the different positions.

Next, a tag position estimation for estimating a position of an RFID tag to be searched (hereinafter, referred to as a target tag) by the wireless tag communication device 1 according to the embodiment will be described.

The wireless tag communication device 1 reads the target tag while moving a position (a self position) thereof in a state of being held by the operator. The wireless tag communication device 1 estimates (determines) directions of the target tag at a plurality of positions, and estimates a position of the target tag based on the directions of the target tag from the plurality of positions. The wireless tag communication device 1 acquires reading results obtained by reading the target tag at a plurality of positions (self positions). The wireless tag communication device 1 estimates the direction of the target tag from each position based on a reading result obtained at the corresponding position and a reading result obtained at a next position. Further, the wireless tag communication device 1 estimates the position of the target tag based on the directions of the target tag from the plurality of positions.

Figure 4:
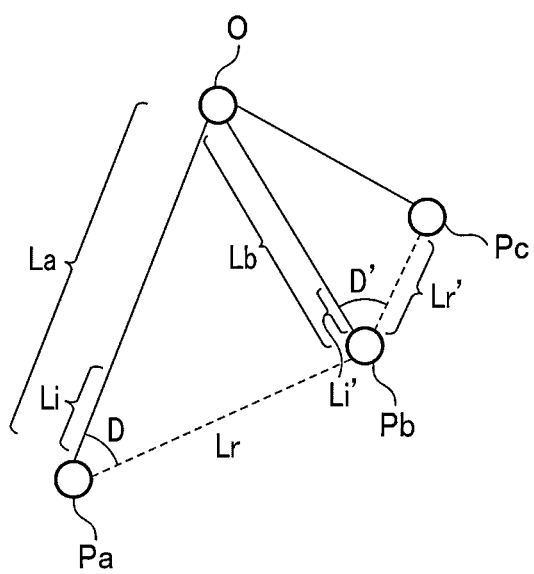
FIG. 4 is a diagram illustrating an example of a positional relationship when the wireless tag communication device according to the embodiment reads, at three different positions, a tag to be searched.

FIG. 4 is a diagram illustrating an example of a positional relationship when the wireless tag communication device 1 reads, at three different positions, an RFID tag O to be searched.

In the example illustrated in FIG. 4, it is assumed that the wireless tag communication device 1 reads the target tag O at a first position Pa, a second position Pb, and a third position Pc. For example, an operator who grips the wireless tag communication device 1 reads the target tag O while moving sequentially from the first position Pa, the second position Pb, to the third position Pc.

The processor 21 of the wireless tag communication device 1 holds, in the memory 22, read information including a position of an own device and a phase of a reception signal, as a result of reading the target tag at each position. The processor 21 determines a distance Lr between the first position Pa and the second position Pb based on the read information obtained at the first position Pa and the read information obtained at the second position Pb. The processor 21 determines a difference distance Li between a distance PaO from the first position Pa to the target tag O and a distance PbO from the second position Pb to the target tag O.

The difference distance Li is calculated by a difference (a phase difference) between the phase of the reception signal (a response wave) received at the first position Pa and the phase of the reception signal (a response wave) received at the second position Pb. That is, the difference distance (Li=La−Lb) between the distance La from the first position Pa to the target tag O and the distance Lb from the second position Pb to the target tag O is presented as a phase difference (a phase change amount). Accordingly, the processor 21 determines the difference distance Li based on the phase difference obtained from the read information obtained at the first position Pa and the read information obtained at the second position Pb.

The processor 21 derives (estimates) an angle D of an angle OAB from a ratio Li/Lr between the distance Lr and the difference distance Li. Here, the angle D derived (estimated) from the ratio Li/Lr is stored in the memory 22 in advance as an angle determination table. After calculating the ratio Li/Lr, the processor 21 determines the angle D corresponding to the calculated ratio Li/Lr based on the angle determination table.

In FIG. 4, an angle OPaPb is the angle D formed by a line segment PaPb and a line segment PaO. Therefore, when the positions (position coordinates) of the position Pa and the position Pb are specified, a direction from the position Pa to the target tag O (a straight line passing through the position Pa and the target tag O) can be specified. The processor 21 determines the direction from the position Pa to the target tag O based on the angle D of the angle OAB determined from the ratio Li/Lr.

By the same method as described above, the processor 21 determines a distance Lr' between the second position Pb and the third position Pc based on the read information obtained at the second position Pb and the read information obtained at the third position Pc. The processor 21 determines a difference distance Li' between the distance PbO from the second position Pb to the target tag O and a distance PcO from the third position Pc to the target tag O. The difference distance Li' is determined based on a phase difference obtained from the read information obtained at the second position Pb and the read information obtained at the third position Pc.

The processor 21 calculates a ratio Li'/Lr' between the distance Lr' and the difference distance Li', and determines an angle D' corresponding to the calculated Li'/Lr' based on the angle determination table. The processor 21 determines a direction of the target tag O from the second position Pb (a straight line passing through the position Pb and the target tag O) based on the angle D' of the angle OPbPc determined from the ratio Li'/Lr'.

The processor 21 determines (estimates) the position of the target tag O based on the direction of the target tag from the first position Pa and the direction of the target tag from the second position Pb. For example, the processor 21 determines an intersection between a straight line PaO passing through the first position Pa and the target tag O and a straight line PbO passing through the second position Pb and the target tag O as the position of the target tag O.

That is, the wireless tag communication device 1 determines (estimates) a direction from one position to the target tag based on the read information of the target tag at two positions. The wireless tag communication device 1 reads the target tag at three or more positions and determines directions to the target tag from a plurality of positions. The wireless tag communication device 1 determines the position of the target tag based on the directions from the plurality of positions to the target tag.

Next, an angle determination table for the wireless tag communication device 1 to determine a direction of a target tag will be described.

FIG. 5 is a table illustrating a relationship between the ratio Li/Lr and the angle D, the ratio Li/Lr being between the distance Lr between two positions and the difference (difference distance) Li between the distances from the two positions to the target tag. In FIG. 5, the distance Lr corresponds to a movement distance (a movement distance of the self position) of the wireless tag communication device 1, and the distance Li corresponds to a distance (difference distance) at which the wireless tag communication device 1 approaches the target tag.

The table shown in FIG. 5 records values in two-dimensional coordinates in which a position of a search object (target tag) is set as an origin O (0, 0) and coordinates of a reference position A are (0, 8). (X, Y) in FIG. 5 indicates coordinates of a variation position B when a movement distance Lr from the reference position A is 0.5 m. An angle in FIG. 5 is an angle (angle OAB) formed by a straight line connecting the position O of the target tag and the reference position A and a straight line connecting the reference position A and the variation position B. A distance in FIG. 5 indicates a distance between the variation position B and the position O of the target tag.

The difference distance Li in FIG. 5 is a distance (Li=La−Lb) obtained by subtracting a distance Lb between the position O of the target tag and the variation position B from a distance La between the position O of the target tag and the reference position A. The difference distance Li is a distance calculated based on a phase change amount between a phase of a signal received from the target tag at the reference position A and a phase of a signal received from the target tag at the variation position B. The ratio Li/Lr in FIG. 5 is a ratio between the movement distance Lr and the difference distance Li.

Figure 6:
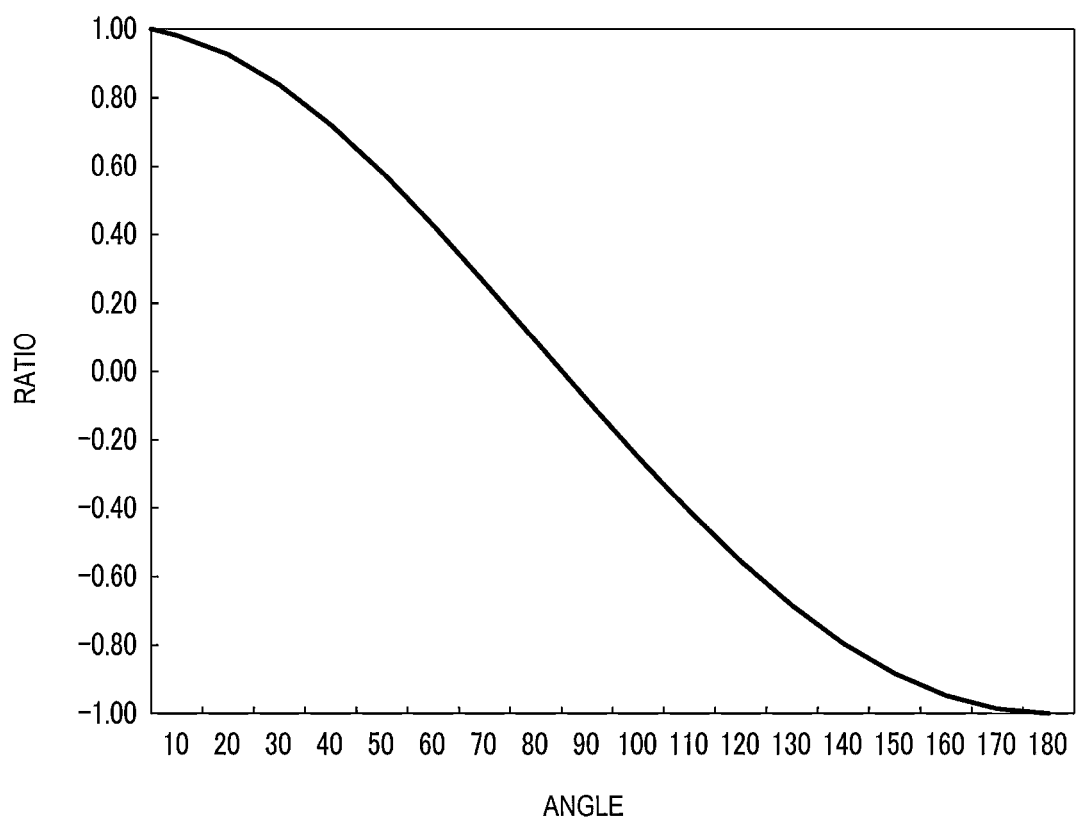
FIG. 6 is a diagram illustrating an example of a graph indicating the angle with respect to the ratio between the movement distance of the wireless tag communication device according to the embodiment and the distance of approaching the tag.

FIG. 6 is a graph illustrating the relationship between the angle specified based on the values shown in FIG. 5 and the ratio Li/Lr. According to the table shown in FIG. 5 or the graph shown in FIG. 6, the angle of the angle OAB can be determined based on the ratio Li/Lr. That is, when the coordinates of the position A, the coordinates of the position B, and the angle of the angle OAB are specified, the direction in which the target tag exists from the position A can be determined even if the coordinates of the target tag are unknown.

By using the table shown in FIG. 5 or the graph shown in FIG. 6, the angle D shown in FIG. 4 can be calculated based on the movement distance Lr and the difference distance Li. Similarly, the angle D' shown in FIG. 4 can be calculated based on the movement distance Lr' and the difference distance Li'. As a result, the position of the target tag illustrated in FIG. 4 can be determined based on the direction (angle D) from the position Pa to the target tag and the direction (angle D') of the target tag from the second position Pb.

As described above, the wireless tag communication device 1 can estimate the tag position by calculating the angle D based on the Li/Lr using the relationship illustrated in the table illustrated in FIG. 5 or the graph illustrated in FIG. 6. FIG. 5 illustrates the relationship between the ratio Li/Lr and the angle D, assuming that the position of the target tag is the origin O (0, 0) and the coordinates of the reference position A are (0, 8). Generally, when a distance between the target tag and the reference position (the self position) changes, the relationship between the ratio Li/Lr and the angle D changes.

Figure 7:
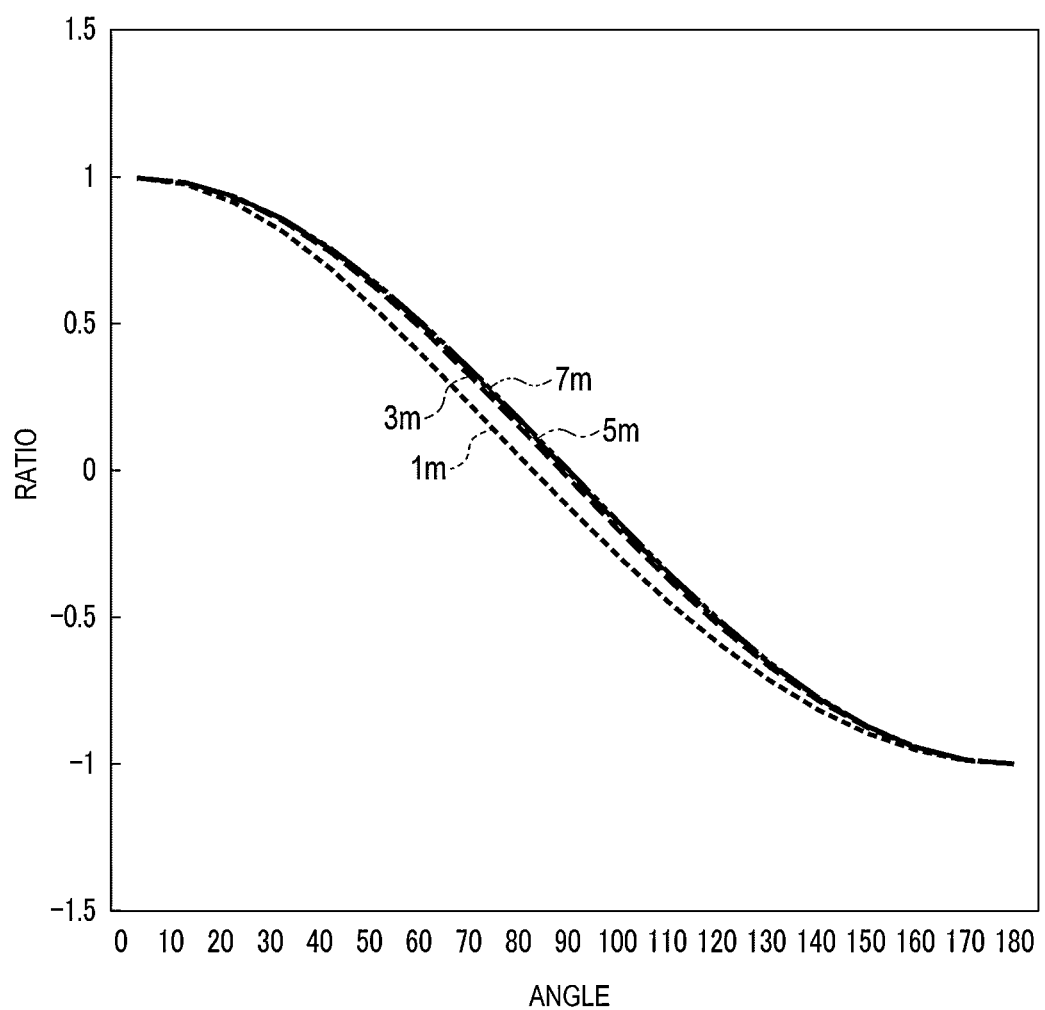
FIG. 7 is a diagram illustrating an example of a graph illustrating, for each distance to the tag, the angle with respect to the ratio between the movement distance of the wireless tag communication device according to the embodiment and the distance of approaching the tag.

FIG. 7 is a graph illustrating a relationship between the ratio Li/Lr and the angle D when the distance between the target tag and the reference position (the self position) changes, the ratio Li/Lr being between the movement distance Lr and the difference distance Li. FIG. 7 illustrates, as a specific example, a graph illustrating a relationship between the ratio Li/Lr and the angle D when the distance between the target tag and the reference position is 7 m, 5 m, 3 m, and 1 m. As illustrated in FIG. 7, when the distance between the target tag and the reference position (that is, the distance to the target tag) changes, the relationship between the ratio Li/Lr and the angle D changes.

When actually searching for the target tag, the distance between the position (the self position) of the wireless tag communication device 1 held by the operator and the target tag changes. For example, in searching for the target tag, it is assumed that the operator holding the wireless tag communication device 1 approaches the target tag while referring to the tag position displayed on the display 14. Therefore, in an actual operation, it is required to increase the angle estimation accuracy (position estimation accuracy) as the wireless tag communication device 1 approaches the target tag.

In the wireless tag communication device 1 according to the embodiment, a relationship between the ratio Li/Lr and the angle D (a data table or a calculation formula) according to the distance between the target tag and the self position is set in order to increase the position estimation accuracy of the target tag. The wireless tag communication device 1 estimates the angle D based on the ratio Li/Lr using the relationship selected according to the distance between the target tag and the self position.

Hereinafter, a first processing example and a second processing example in which the wireless tag communication device 1 according to the embodiment estimates the tag position using the relationship according to the distance to the target tag will be described.

First, as the first processing example, a first tag search will be described in which a tag position estimation is performed using the angle determination table according to the distance to the target tag.

In the first tag search, the wireless tag communication device 1 executes the tag position estimation using the data table (the angle determination table) indicating the relationship between the ratio Li/Lr and the angle D. The wireless tag communication device 1 stores, in the memory 22, a plurality of angle determination tables set for each distance to the target tag. The wireless tag communication device 1 executes the tag position estimation using the angle determination table selected according to the distance to the target tag.

FIG. 8 is a diagram illustrating an example in which the angle determination table is set according to a distance L to an estimated tag position.

The example illustrated in FIG. 8 illustrates an angle determination table when the distance L to the target tag is divided into ranges of 1.5 m or less, 1.5 to 2.5 (2±0.5) m, 2.5 to 3.5 (3±0.5) m, 3.5 to 4.5 (4±0.5) m, 4.5 to 5.5 (5±0.5) m, 5.5 to 6.5 (6±0.5) m, 6.5 to 7.5 (7±0.5) m, and 7.5 m or more.

The wireless tag communication device 1 estimates the distance to the tag position and selects the angle determination table according to the distance to the tag position. The wireless tag communication device 1 estimates the angle D based on the Li/Lr using the selected angle determination table. For example, if the distance L to the target tag is 1 m, the wireless tag communication device 1 selects an angle determination table for 1.5 m or less. In this case, the wireless tag communication device 1 estimates the angle D based on the ratio Li/Lr using the angle determination table for 1.5 m or less.

Next, the tag search (the first tag search) including an angle estimation using a table, which is performed by the wireless tag communication device 1 according to the embodiment, will be described.

Figure 9:
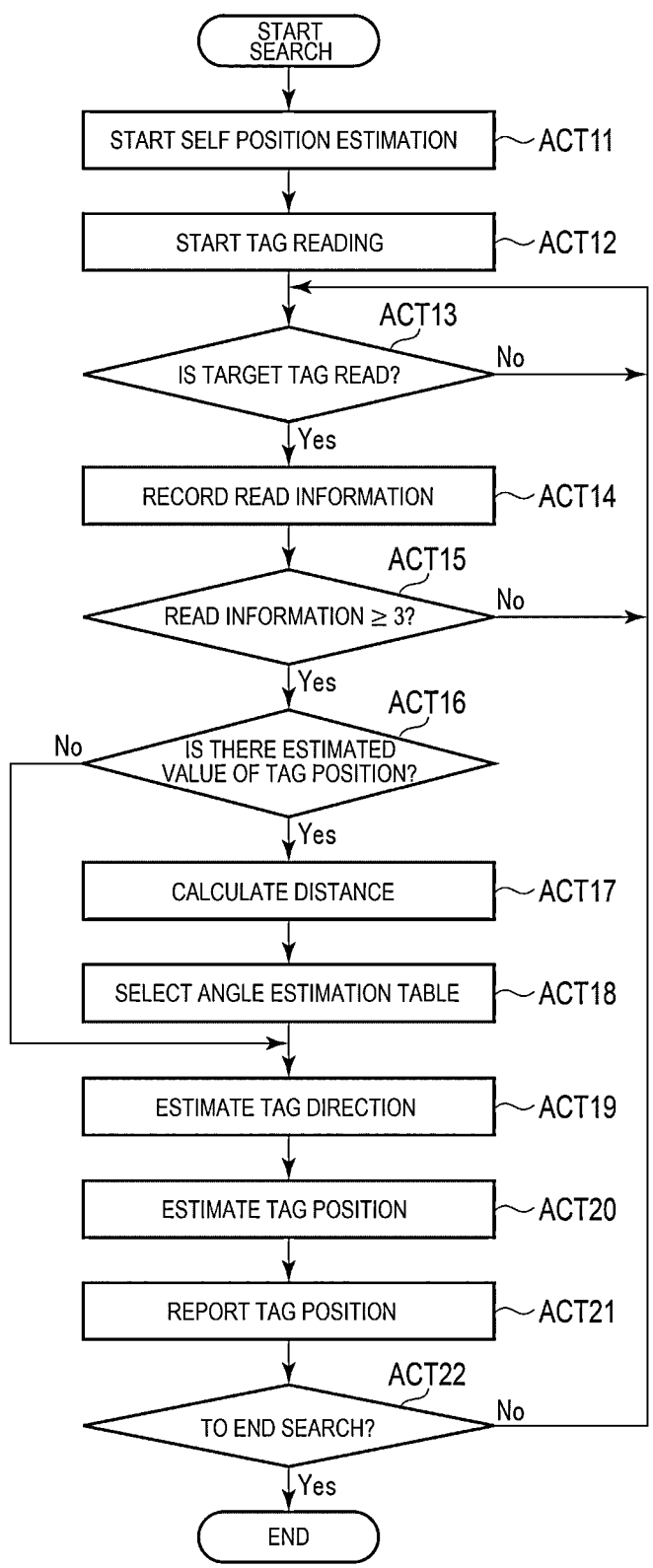
FIG. 9 is a flowchart illustrating an operation example of a first tag search including an angle estimation using a table, which is performed by the wireless tag communication device according to the embodiment.

FIG. 9 is a flowchart illustrating an operation example of the first tag search including the angle estimation using a table, which is performed by the wireless tag communication device 1 according to the embodiment.

The processor 21 of the wireless tag communication device 1 operates in a search mode after registering an operator, who is a searcher, based on information input via the input device 15. The processor 21 sets an RFID tag to be searched (a target tag) that is designated by the operator. After setting the target tag, the processor 21 starts searching of the target tag in response to an instruction to start searching from the operator. When starting the searching of the target tag, the processor 21 starts an estimation of a position of an own device (a self position) and reading of the target tag (ACT 11 and ACT 12).

As the estimation of the self position, the processor 21 estimates the self position based on a detection signal detected by the sensor 24 or 34. As the self position, the processor 21 may estimate a relative position from a processing start position or may estimate an absolute position. The processor 21 repeatedly executes the estimation of the self position at a specific timing as the estimation of the self position. The processor 21 stores, in the memory 22, position information indicating the self position obtained by the estimation of the self position.

The processor 21 performs processing of reading the target tag at a predetermined reading cycle by the wireless tag communication unit 23. The wireless tag communication unit 23 transmits a response request (a read command), and the processor 21 receives, as a reception signal, a response wave output from the RFID tag in a reading area in response to the response request. The processor 21 acquires the reception signal including tag information on the target tag as a reading result of the target tag.

If the target tag is read (ACT 13, YES), the processor 21 stores (records), in the memory 22, read information including the reading result including phase information on the signal received from the target tag (the reading result of the target tag) and the position information indicating the self position (ACT 14). For example, the processor 21 stores, in the memory 22, read information in which the reading result of the target tag and the position information indicating the self position are associated with each other at each predetermined interval for executing the tag position estimation. The predetermined interval for executing the tag position estimation may be an interval (cycle or distance) different from the reading cycle.

The processor 21 determines whether there are three or more pieces of read information used for the tag position estimation at each predetermined interval for executing the tag position estimation (ACT 15). For example, in the tag position estimation described above, reading results obtained by reading the target tag at different self positions are necessary. Therefore, the processor 21 determines whether three pieces of read information at different self positions used for the tag position estimation exist in the memory 22 at each predetermined interval. When three pieces of read information used for the tag position estimation are not present (ACT 15, NO), the processor 21 returns to the above ACT 13.

If there are three pieces of read information used for the tag position estimation (ACT 15, Yes), the processor 21 determines whether an estimated tag position (an estimated value of the tag position) exists (ACT 16). For example, the processor 21 stores the tag position estimated in the tag position estimation (the estimated tag position) in the memory 22. The processor 21 determines whether an estimated tag position exists in the memory 22.

If there is no estimated tag position (ACT 16, No), the processor 21 proceeds to ACT 19. In this case, since the tag position is unknown, the processor 21 does not know the distance to the target tag. Therefore, it is assumed that in the processor 21, an initial angle determination table is set as the angle determination table. For example, in the processor 21, the distance to the target tag is set to the maximum (7.5 m or more in the example illustrated in FIG. 8) in the initial setting, and an angle determination table according to the maximum distance is set.

If there is an estimated tag position (ACT 16, Yes), the processor 21 calculates the distance to the target tag based on the latest estimated tag position and the self position (ACT 17). After calculating the distance to the target tag, the processor 21 selects an angle estimation table based on the calculated distance to the target tag (ACT 18). For example, the processor 21 selects an angle estimation table that matches the calculated distance to the target tag from a plurality of angle estimation tables set for each distance to the target tag. The processor 21 sets the angle determination table selected based on the distance to the target tag as the angle determination table used for the tag position estimation.

The processor 21 executes the tag position estimation when the angle determination table according to the distance to the target tag is set. As the tag position estimation, the processor 21 estimates a direction of the target tag (ACT 19), and estimates a position of the target tag based on the direction of the target tag (ACT 20).

For example, the processor 21 calculates Li, Lr, Li', and Lr' as illustrated in FIG. 4 by arranging three pieces of read information used for the tag position estimation in time series. After calculating the distance Li and the distance Lr, the processor 21 estimates the angle D corresponding to the ratio Li/Lr based on the set angle determination table. After calculating the distance Li' and the distance Lr', the processor 21 estimates the angle D' corresponding to the ratio Li'/Lr' based on the set angle determination table.

Referring to FIG. 4, the processor 21 estimates the direction from the first position (Pa) indicated by the angle D estimated based on the ratio Li/Lr to the target tag (O). The processor 21 estimates the direction from the second position (Pb) indicated by the angle D' estimated based on the ratio Li'/Lr' to the target tag (O). The processor 21 estimates the position of the target tag (O) based on the direction from the first position (Pa) to the target tag (O) and the direction from the second position (Pb) to the target tag (O).

When the position of the target tag is estimated, the processor 21 reports information indicating the estimated position of the target tag (ACT 21). For example, the processor 21 displays, on the display 14, information indicating the estimated position of the target tag. Accordingly, the operator can directly know not a direction in which the target tag exists but the position where the target tag exists.

The processor 21 receives an instruction to end the search while reporting the position of the target tag (ACT 22). For example, the processor 21 receives an instruction to end the search from the operator using the input device 15. When there is no instruction to end the search (ACT 22, NO), the processor 21 returns to ACT 13 and repeatedly executes the above-described processing. When the instruction to end the search is given (ACT 22, YES), the processor 21 ends the searching of the target tag.

As described above, according to the first tag search, the wireless tag communication device holds a plurality of angle determination tables according to the distances to the target tag. The wireless tag communication device estimates the distance to the target tag and selects the angle determination table according to the distance to the target tag. When three or more pieces of read information at different positions are obtained, the wireless tag communication device estimates the direction of the target tag from a plurality of positions using the angle determination table set according to the distance to the target tag. The wireless tag communication device estimates the position of the target tag based on the direction of the target tag from the plurality of positions.

Accordingly, the wireless tag communication device can estimate the direction of the target tag based on the table according to the distance to the target tag, and can perform the tag position estimation based on the estimation result of the direction. Since the direction estimation according to the angle determination table is simple, a high-speed tag position estimation can be implemented.

Next, a second tag search will be described in which the wireless tag communication device 1 according to the embodiment performs a tag position estimation using a calculation formula according to the distance to the target tag.

In the second tag search, the wireless tag communication device 1 executes a tag position estimation including an estimation of a tag direction using a calculation formula indicating the relationship between the ratio Li/Lr and the angle D. The wireless tag communication device 1 stores, in the memory 22, a plurality of calculation formulas set for each distance to the target tag. The wireless tag communication device 1 estimates the position of the target tag based on the direction of the target tag estimated using a calculation formula selected according to the distance to the target tag.

FIGS. 10 to 13 are diagrams illustrating examples of calculation formulas and graphs illustrating a relationship between the ratio Li/Lr and the angle D when the distance L to the target tag is specified.

Figure 10:
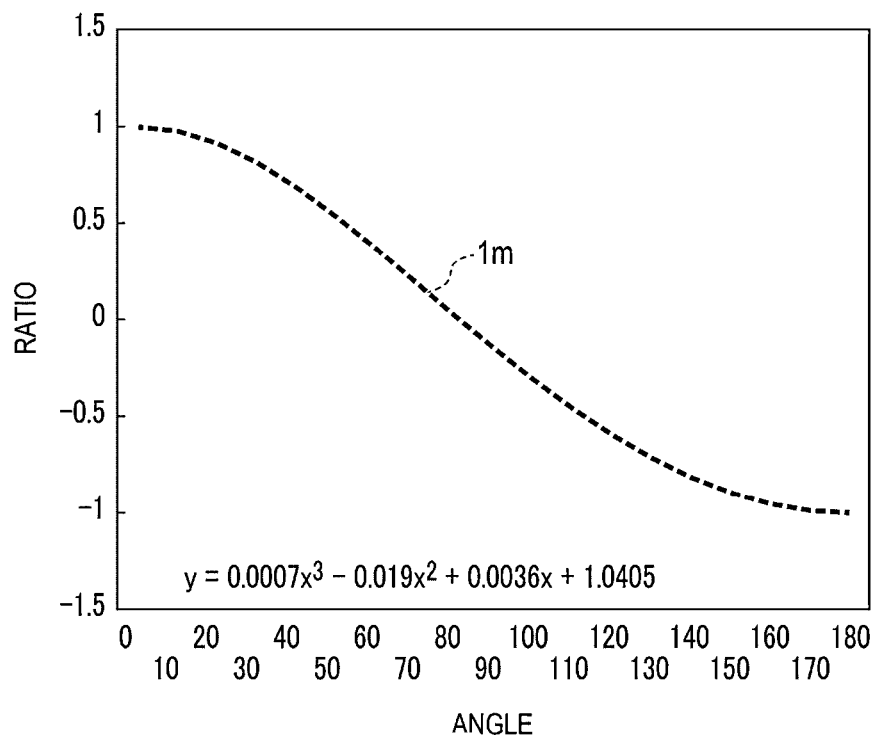
FIG. 10 illustrates a relational expression and a graph illustrating a relationship between a ratio Li/Lr and an angle D when the distance from the wireless tag communication device according to the embodiment to the tag is 1 m.
Figure 11:
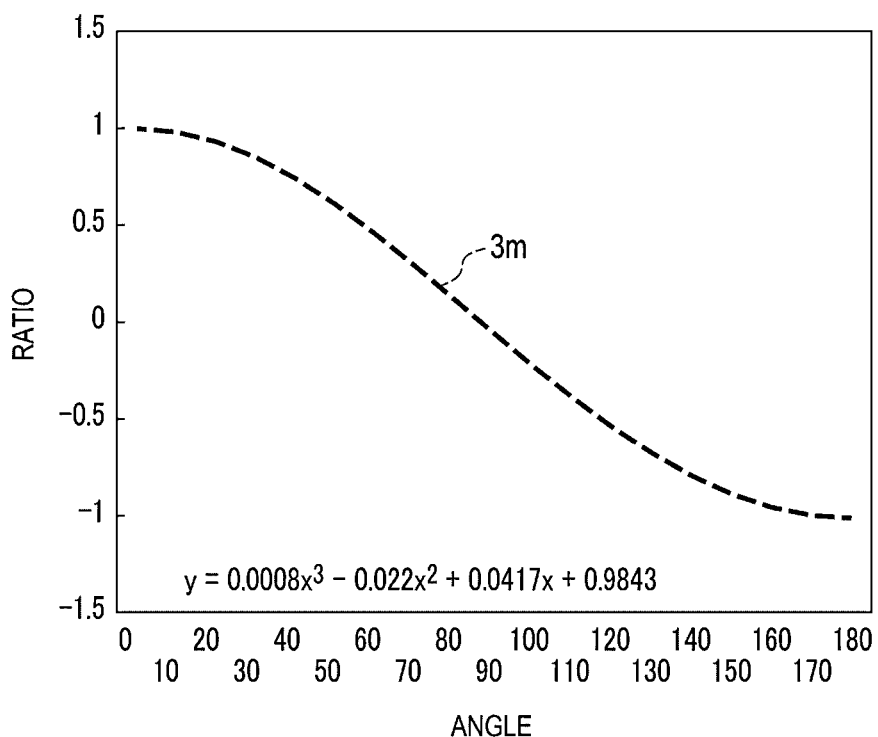
FIG. 11 illustrates a relational expression and a graph illustrating a relationship between the ratio Li/Lr and the angle D when the distance from the wireless tag communication device according to the embodiment to the tag is 3 m.
Figure 12:
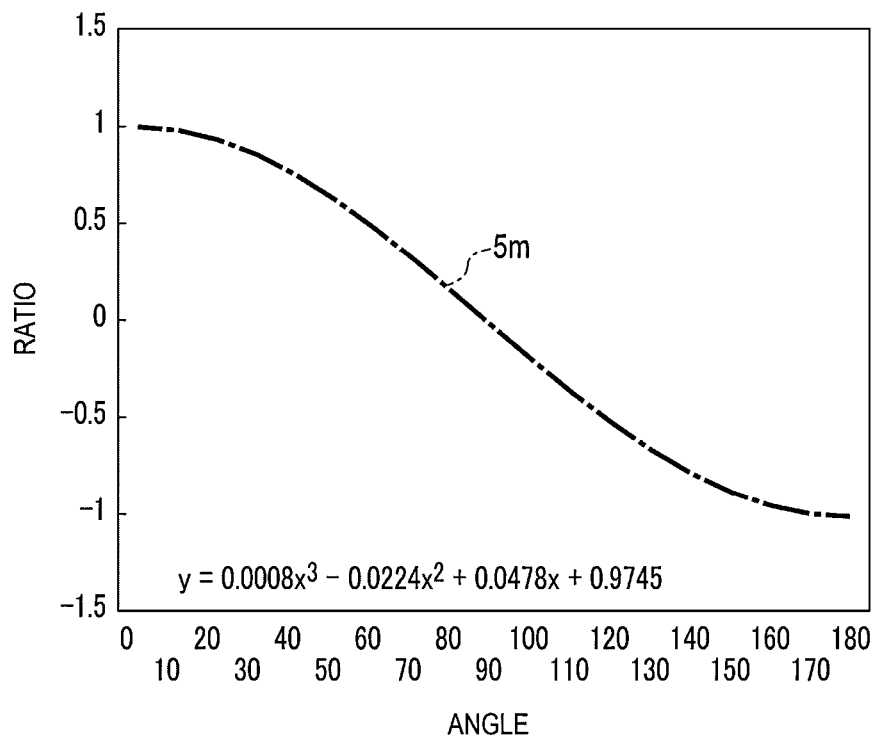
FIG. 12 illustrates a relational expression and a graph illustrating a relationship between the ratio Li/Lr and the angle D when the distance from the wireless tag communication device according to the embodiment to the tag is 5 m.
Figure 13:
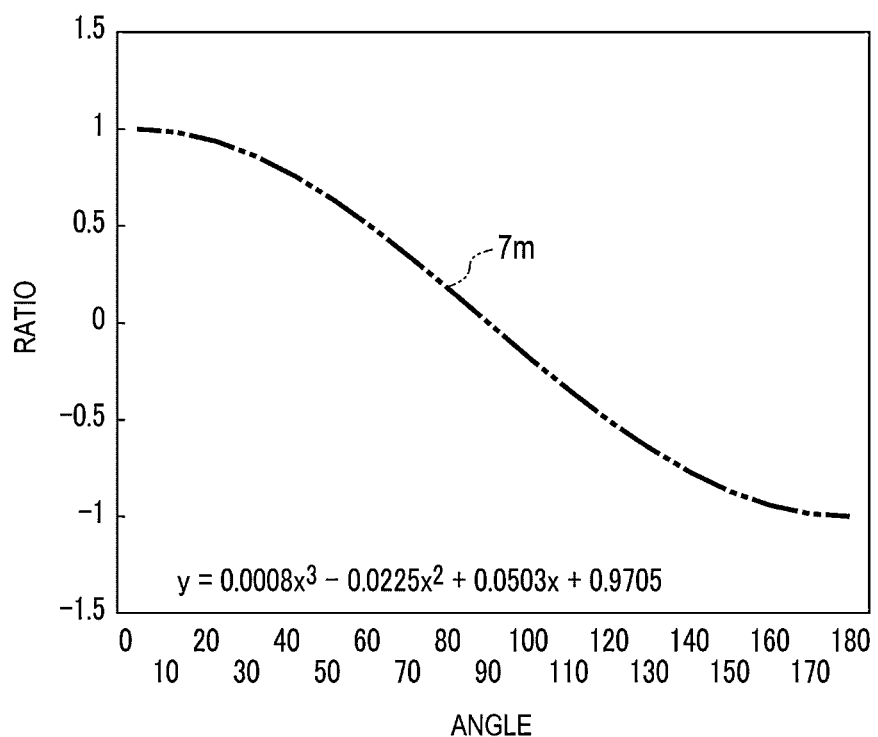
FIG. 13 illustrates a relational expression and a graph illustrating a relationship between the ratio Li/Lr and the angle D when the distance from the wireless tag communication device according to the embodiment to the tag is 7 m.

FIG. 10 illustrates a relational expression and a graph illustrating a relationship between the ratio Li/Lr and the angle D when the distance L to the target tag is 1 m. FIG. 11 illustrates a relational expression and a graph illustrating a relationship between the ratio Li/Lr and the angle D when the distance L to the target position is 3 m. FIG. 12 illustrates a relational expression and a graph illustrating a relationship between the ratio Li/Lr and the angle D when the distance L to the target tag is 5 m. FIG. 13 illustrates a relational expression and a graph illustrating a relationship between the ratio Li/Lr and the angle D when the distance L to the target tag is 7 m.

The relational expressions illustrated in FIGS. 10 to 13 are calculation formulas, where "y" is the ratio Li/Lr on a vertical axis and "x" is the angle D on a horizontal axis. According to the relational expressions (calculation formulas) illustrated in FIGS. 10 to 13, when the ratio Li/Lr is obtained, the processor 21 can calculate x as the angle D by substituting the ratio Li/Lr into y.

FIG. 14 is a diagram illustrating an example of a calculation formula set for each distance L to the target tag. The example illustrated in FIG. 14 illustrates a calculation formula when the distance L to the target tag is divided into ranges of 1.5 m or less, 1.5 to 2.5 (2±0.5) m, 2.5 to 3.5 (3±0.5) m, 3.5 to 4.5 (4±0.5) m, 4.5 to 5.5 (5±0.5) m, 5.5 to 6.5 (6±0.5) m, 6.5 to 7.5 (7±0.5) m, and 7.5 m or more.

In the example illustrated in FIG. 14, the relational expression illustrated in FIG. 10 is set as the calculation formula for 1.5 m or less. Similarly, in the example illustrated in FIG. 14, the relational expressions illustrated in FIGS. 11, 12, and 13 are set as the calculation formulas for the distance L of 3±0.5 m, 5±0.5 m, and 7.5 m or more. Graphs and relational expressions when the distance L to the tag position is 2 m, 4 m, and 6 m are similarly obtained. Therefore, calculation formulas for the distances L of 2±0.5 m, 4±0.5 m, and 6±0.5 m illustrated in FIG. 14 can be set by the relational expressions for the distances L of 2 m, 4 m, and 6 m.

The wireless tag communication device 1 estimates the distance to the tag position and selects the calculation formula according to the distance to the tag position. The wireless tag communication device 1 estimates the angle D based on the ratio Li/Lr using the selected calculation formula. For example, when the distance L to the target tag is 1 m, the wireless tag communication device 1 estimates the angle D based on the ratio Li/Lr using the calculation formula for 1.5 m or less.

Next, the second tag search including the angle estimation using the calculation formula, which is performed by the wireless tag communication device 1 according to the embodiment, will be described.

Figure 15:
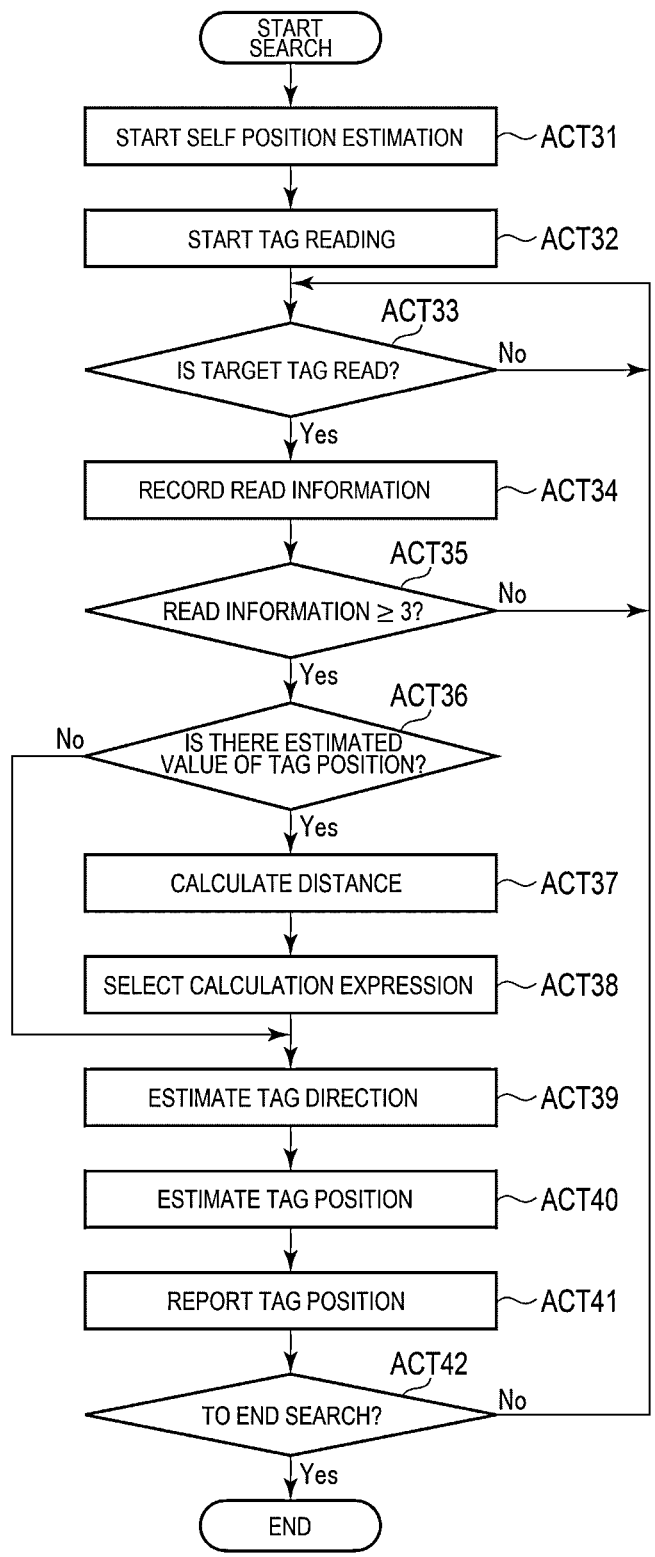
FIG. 15 is a flowchart illustrating an operation example of a second tag search including an angle estimation using a calculation formula, which is performed by the wireless tag communication device according to the embodiment.

FIG. 15 is a flowchart illustrating an operation example of the second tag search including the angle estimation using the calculation formula, which is performed by the wireless tag communication device 1 according to the embodiment.

The processor 21 of the wireless tag communication device 1 operates in a search mode after registering an operator, who is a searcher, based on information input via the input device 15. The processor 21 sets an RFID tag to be searched (a target tag) that is designated by the operator. After setting the target tag, the processor 21 starts searching of the target tag in response to an instruction to start searching from the operator.

When starting the searching of the target tag, the processor 21 starts an estimation of a position of an own device (a self position) and reading of the target tag (ACT 31 and ACT 32).

As the estimation of the self position, the processor 21 estimates the self position based on a detection signal detected by the sensor 24 or 34. As the self position, the processor 21 may estimate a relative position from a processing start position or may estimate an absolute position. The processor 21 stores, in the memory 22, position information indicating the self position obtained by the estimation of the self position.

The processor 21 performs processing of reading the target tag at a predetermined reading cycle by the wireless tag communication unit 23. The wireless tag communication unit 23 transmits a response request (a read command), and the processor 21 receives, as a reception signal, a response wave output from the RFID tag in a reading area in response to the response request. The processor 21 acquires the reception signal including tag information on the target tag as a reading result of the target tag.

If the target tag is read (ACT 33, YES), the processor 21 stores (records), in the memory 22, read information including the reading result including phase information on the signal received from the target tag (the reading result of the target tag) and the position information indicating the self position (ACT 34). For example, the processor 21 stores, in the memory 22, read information in which the reading result of the target tag and the position information indicating the self position are associated with each other at each predetermined interval for executing the tag position estimation. The predetermined interval for executing the tag position estimation may be an interval (cycle or distance) different from the reading cycle.

The processor 21 determines whether there are three or more pieces of read information used for the tag position estimation at each predetermined interval for executing the tag position estimation (ACT 35). For example, in the tag position estimation described above, reading results obtained by reading the target tag at different self positions are necessary. Therefore, the processor 21 determines whether three pieces of read information at different self positions used for the tag position estimation exist in the memory 22 at each predetermined interval. When three pieces of read information used for the tag position estimation are not present (ACT 35, NO), the processor 21 returns to the above ACT 13.

If there are three pieces of read information used for the tag position estimation (ACT 35, Yes), the processor 21 determines whether an estimated tag position (an estimated value of the tag position) exists (ACT 36). The processor 21 stores the tag position estimated in the tag position estimation (the estimated tag position) in the memory 22. The processor 21 determines whether an estimated tag position exists in the memory 22.

If there is no estimated tag position (ACT 36, No), the processor 21 proceeds to ACT 39. In this case, since the tag position is unknown, the processor 21 does not know the distance to the target tag. Therefore, it is assumed that in the processor 21, an initial angle determination table is set as the angle determination table. For example, in the processor 21, the distance to the target tag is set to the maximum (7.5 m or more in the example illustrated in FIG. 14) in the initial setting, and an angle determination table according to the maximum distance is set.

If there is an estimated tag position (ACT 36, Yes), the processor 21 calculates the distance to the target tag based on the latest estimated tag position and the self position (ACT 37). After calculating the distance to the target tag, the processor 21 selects an angle estimation table based on the calculated distance to the target tag (ACT 38). For example, the processor 21 selects an angle estimation table that matches the calculated distance to the target tag from a plurality of angle estimation tables set for each distance to the target tag. The processor 21 sets the angle determination table selected based on the distance to the target tag as the angle determination table used for the tag position estimation.

The processor 21 executes the tag position estimation when the angle determination table according to the distance to the target tag is set. As the tag position estimation, the processor 21 estimates a direction of the target tag (ACT 39), and estimates a position of the target tag based on the direction of the target tag (ACT 40).

For example, the processor 21 calculates Li, Lr, Li', and Lr' as illustrated in FIG. 4 by arranging three pieces of read information used for the tag position estimation in time series. After calculating the distance Li and the distance Lr, the processor 21 estimates the angle D corresponding to the ratio Li/Lr based on the set angle determination table. After calculating the distance Li' and the distance Lr', the processor 21 estimates the angle D' corresponding to the ratio Li'/Lr' based on the set angle determination table.

Referring to FIG. 4, the processor 21 estimates the direction from the first position (Pa) indicated by the angle D estimated based on the ratio Li/Lr to the target tag (O). The processor 21 estimates the direction from the second position (Pb) indicated by the angle D' estimated based on the ratio Li'/Lr' to the target tag (O). The processor 21 estimates the position of the target tag (O) based on the direction from the first position (Pa) to the target tag (O) and the direction from the second position (Pb) to the target tag (O).

When the position of the target tag is estimated, the processor 21 reports information indicating the estimated position of the target tag (ACT 41). For example, the processor 21 displays, on the display 14, information indicating the estimated position of the target tag. Accordingly, the operator can directly know not a direction in which the target tag exists but the position where the target tag exists.

The processor 21 receives an instruction to end the search while reporting the position of the target tag (ACT 42). For example, the processor 21 receives an instruction to end the search from the operator using the input device 15. When there is no instruction to end the search (ACT 42, NO), the processor 21 returns to ACT 33 and repeatedly executes the above-described processing. When the instruction to end the search is given (ACT 42, YES), the processor 21 ends the searching of the target tag.

As described above, according to the second tag search, the wireless tag communication device holds a plurality of calculation formulas for the angle estimation according to the distances to the target tag. The wireless tag communication device estimates the distance to the target tag and selects the calculation formula used for the angle estimation according to the distance to the target tag. When three or more pieces of read information at different positions are obtained, the wireless tag communication device estimates the direction of the target tag from a plurality of positions using the calculation formula selected according to the distance to the target tag. The wireless tag communication device estimates the position of the target tag based on the direction of the target tag from the plurality of positions.

Accordingly, the wireless tag communication device can estimate the direction of the target tag by the calculation formula according to the distance to the target tag, and can estimate the position of the target tag based on the estimation result of the direction. In the direction estimation using the calculation formula, the angle corresponding to the ratio can be calculated with fine granularity using the calculation formula, and the direction can be estimated with high precision.

Next, a modification of the first tag search and the second tag search described above will be described.

The tag search may be performed by combining the angle estimation using the angle determination table in the first tag search and the angle estimation using the calculation formula in the second tag search. For example, as a modification, any one of the angle estimation using the angle determination table and the angle estimation using the calculation formula may be selected and performed.

In a first modification, the angle estimation using the angle determination table and the angle estimation using the calculation formula are selected and performed according to the distance to the target tag. When implementing the first modification, for example, a threshold value (a predetermined value) for selecting either angle estimation using the angle determination table or angle estimation using the calculation formula is stored in the memory 22. If the distance to the target tag is greater than the predetermined value, the processor 21 of the wireless tag communication device 1 selects the angle estimation using the angle determination table. If the distance to the target tag is equal to or smaller than the predetermined value, the processor 21 selects the angle estimation using the calculation formula.

When the target tag is far away (when the distance to the target tag is equal to or greater than the predetermined value), the wireless tag communication device according to the first modification can estimate an angle by the angle estimation using the angle determination table that is easy to process. When the target tag is close (when the distance is equal to or smaller than the predetermined value), the wireless tag communication device according to the first modification can estimate the angle by the angle estimation using a highly accurate calculation formula.

In a second modification, the angle estimation using an angle determination table and the angle estimation using a calculation formula are selected and performed according to the ratio Li/Lr. When implementing the second modification, for example, a threshold value (a predetermined value) for the ratio Li/Lr for selecting either angle estimation using the angle determination table or angle estimation using the calculation formula is stored in the memory 22. If the ratio Li/Lr is greater than the predetermined value, the processor 21 of the wireless tag communication device 1 selects the angle estimation using the angle determination table. If the ratio Li/Lr is equal to or smaller than the predetermined value, the processor 21 selects the angle estimation using the calculation formula.

When the ratio Li/Lr is large, the wireless tag communication device according to the second modification can estimate an angle by the angle estimation using the angle determination table that is easy to process. When the ratio Li/Lr is small, the wireless tag communication device according to the second modification can estimate an angle by the angle estimation using a highly accurate calculation formula.

In the embodiments described above, a case where a program executed by the processor is stored in advance in the memory of the device is described. However, the program executed by the processor may be downloaded from a network to the device or may be installed from a storage medium to the device. The storage medium may be any storage medium such as a CD-ROM that can store a program and can be read by the device. Functions obtained by installation or download in advance may be implemented in cooperation with an operating system (OS) or the like in the device.

Each function of the embodiments described above can be realized by one or more processing circuits. Here, the term "processing circuit" as used herein includes a processor programmed to execute each function by software, such as a processor implemented by an electronic circuit, or a device such as an ASIC (Application Specific Integrated Circuit), a DSP (Digital Signal Processor), a FPGA (Field Programmable Gate Array), and conventional circuit modules.

While certain embodiments have been described, these embodiments have been presented by way of example only, and are not intended to limit the scope of the exemplary embodiments. These novel embodiments can be implemented in various other forms, and various omissions, substitutions, and modifications can be made without departing from the gist of the disclosure. The embodiments and the modifications thereof are included in the scope and the spirit of the disclosure, and are included in a scope of the invention disclosed in the claims and equivalents thereof.

What is claimed is:

1. A wireless tag communication device, comprising:
   a communication device configured to communicate with a wireless tag that is a target;
   a position detection sensor configured to detect information indicating a self position of the wireless tag communication device;
   a memory configured to store the self position, which is specified based on the information detected by the position detection sensor, in association with a reading result obtained by the communication device reading the wireless tag; and
   a processor configured to estimate, using a processing method selected according to a distance between the self position, which is specified based on the information detected by the position detection sensor, and an estimated position of the wireless tag, a position of the wireless tag based on reading results obtained by reading the wireless tag at three different self positions each including the self position serving as an endpoint of the distance, the reading results being stored in the memory.

2. The wireless tag communication device according to claim 1, wherein
   the processor specifies a direction from a first self position to the wireless tag and a direction from a second self position to the wireless tag using a table selected according to the distance.

3. The wireless tag communication device according to claim 1, wherein
   the processor calculates a direction from a first self position to the wireless tag and a direction from a second self position to the wireless tag using a calculation formula selected according to the distance.

4. The wireless tag communication device according to claim 1, wherein
   the processor specifies a direction from a first self position to the wireless tag and a direction from a second self position to the wireless tag using a table selected according to the distance if the distance is equal to or greater than a predetermined value, and calculates the direction from the first self position to the wireless tag and the direction from the second self position to the wireless tag using a calculation formula selected according to the distance if the distance is equal to or smaller than the predetermined value.

5. The wireless tag communication device according to claim 1, wherein
   the processor specifies a direction from a first position to the wireless tag and a direction from a second position to the wireless tag using a table selected according to the distance if a ratio between a distance of approaching the wireless tag and a movement distance of the self position is equal to or greater than a predetermined value, and calculates the direction from the first position to the wireless tag and the direction from the second position to the wireless tag using a calculation formula selected according to the distance if the ratio is equal to or smaller than the predetermined value.

6. The wireless tag communication device according to claim 1, further comprising an antenna.

7. The wireless tag communication device according to claim 6, wherein
   the antenna is provided so as to have a directivity in a direction to a front side of the wireless tag communication device.

8. A wireless tag communication method, comprising:
   acquiring information indicating a self position of an information processing device at which a signal is received from a wireless tag that is a target;
   storing the self position in association with a reading result that is based on the signal received from the wireless tag; and
   estimating, using a processing method selected according to a distance between the self position and an estimated position of the wireless tag, a position of the wireless tag based on reading results obtained by reading the wireless tag at three different self positions each including the self position serving as an endpoint of the distance.

9. The wireless tag communication method according to claim 8, further comprising:
   specifying a direction from a first self position to the wireless tag and a direction from a second self position to the wireless tag using a table selected according to the distance.

10. The wireless tag communication method according to claim 8, further comprising:
    calculating a direction from a first self position to the wireless tag and a direction from a second self position to the wireless tag using a calculation formula selected according to the distance.

11. The wireless tag communication method according to claim 8, further comprising:
    specifying a direction from a first self position to the wireless tag and a direction from a second self position to the wireless tag using a table selected according to the distance if the distance is equal to or greater than a predetermined value; and
    calculating the direction from the first self position to the wireless tag and the direction from the second self position to the wireless tag using a calculation formula selected according to the distance if the distance is equal to or smaller than the predetermined value.

12. The wireless tag communication method according to claim 8, further comprising:
    specifying a direction from a first position to the wireless tag and a direction from a second position to the wireless tag using a table selected according to the distance if a ratio between a distance of approaching the wireless tag and a movement distance of the self position is equal to or greater than a predetermined value; and
    calculating the direction from the first position to the wireless tag and the direction from the second position to the wireless tag using a calculation formula selected according to the distance if the ratio is equal to or smaller than the predetermined value.

13. A hand-held portable wireless tag communication device, comprising:
    a gripable handle;
    a communication device configured to communicate with a wireless tag that is a target;
    a position detection sensor configured to detect information indicating a self position of the wireless tag communication device;
    a memory configured to store the self position, which is specified based on the information detected by the position detection sensor, in association with a reading result obtained by the communication device reading the wireless tag; and a processor configured to estimate, using a processing method selected according to a distance between the self position, which is specified based on the information detected by the position detection sensor, and an estimated position of the wireless tag, a position of the wireless tag based on reading results obtained by reading the wireless tag at three different self positions each including the self position serving as an endpoint of the distance, the reading results being stored in the memory.

14. The hand-held portable wireless tag communication device according to claim 13, wherein
the processor specifies a direction from a first self position to the wireless tag and a direction from a second self position to the wireless tag using a table selected according to the distance.

15. The hand-held portable wireless tag communication device according to claim 13, wherein
the processor calculates a direction from a first self position to the wireless tag and a direction from a second self position to the wireless tag using a calculation formula selected according to the distance.

16. The hand-held portable wireless tag communication device according to claim 13, wherein
the processor specifies a direction from a first self position to the wireless tag and a direction from a second self position to the wireless tag using a table selected according to the distance if the distance is equal to or greater than a predetermined value, and calculates the direction from the first self position to the wireless tag and the direction from the second self position to the wireless tag using a calculation formula selected according to the distance if the distance is equal to or smaller than the predetermined value.

17. The hand-held portable wireless tag communication device according to claim 13, wherein
the processor specifies a direction from a first position to the wireless tag and a direction from a second position to the wireless tag using a table selected according to the distance if a ratio between a distance of approaching the wireless tag and a movement distance of the self position is equal to or greater than a predetermined value, and calculates the direction from the first position to the wireless tag and the direction from the second position to the wireless tag using a calculation formula selected according to the distance if the ratio is equal to or smaller than the predetermined value.

18. The hand-held portable wireless tag communication device according to claim 13, further comprising an antenna.

19. The hand-held portable wireless tag communication device according to claim 18, wherein
the antenna is provided so as to have a directivity in a direction to a front side of the wireless tag communication device.

* * * * *